(12) United States Patent
Watanabe et al.

(10) Patent No.: US 7,613,545 B2
(45) Date of Patent: Nov. 3, 2009

(54) OFFLINE PROGRAMMING DEVICE

(75) Inventors: Atsushi Watanabe, Tokyo (JP);
Hirohiko Kobayashi, Fujiyoshida (JP);
Yoshiharu Nagatsuka, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 580 days.

(21) Appl. No.: 11/099,504

(22) Filed: Apr. 6, 2005

(65) Prior Publication Data

US 2005/0224479 A1      Oct. 13, 2005

(30) Foreign Application Priority Data

Apr. 7, 2004    (JP) .............................. 2004-113544

(51) Int. Cl.
*G06F 19/00*     (2006.01)
(52) U.S. Cl. .................................... 700/245
(58) Field of Classification Search ............ 219/124.22, 219/125.1; 318/568.11, 568.13, 577; 414/1; 901/2
See application file for complete search history.

(56) References Cited

U.S. PATENT DOCUMENTS

| | | | |
|---|---|---|---|
| 5,906,761 | A | 5/1999 | Gilliland et al. |
| 6,249,718 | B1 * | 6/2001 | Gilliland et al. .............. 700/255 |
| 7,110,859 | B2 * | 9/2006 | Shibata et al. ............... 700/245 |

FOREIGN PATENT DOCUMENTS

| | | |
|---|---|---|
| JP | 6-161532 | 6/1994 |
| JP | 11-165239 | 6/1999 |
| WO | 02/066209 | 8/2002 |

OTHER PUBLICATIONS

Cook, George E., et al; An Intelligent Robotics Simulator; Industry Application Society Annual Meeting, 1994; Oct. 1994; pp. 1793-1800.

* cited by examiner

*Primary Examiner*—Khoi Tran
*Assistant Examiner*—Nicholas Kiswanto
(74) *Attorney, Agent, or Firm*—Drinker Biddle & Reath LLP

(57) ABSTRACT

An offline programming device in which a path for preventing interference may be automatically inserted such that a welding robot does not interfere with a jig clamping a workpiece to be welded. The models of the robot, the workpiece and the clamp jig are indicated on a display for determining the path for preventing interference. A simulation is carried out to judge that interference with the jig may occur. When it is judged that interference will occur, data of the preventing path suitable for a straight path passing through the jig are read out from a library including registered preventing paths corresponding to shapes of various jigs. The data of the preventing path includes the three-dimensional data of each point of the path as the incremental value in relation to a reference point of the path. Also, the orientation of a welding torch is registered. The corrected welding program may be downloaded to the actual robot so as to correct the uploaded offline program by using a test result in the actual robot.

9 Claims, 10 Drawing Sheets

OFFLINE PROGRAMMING DEVICE

BACKGROUND OF THE INVENTION

1. Field of the Invention

The present invention relates to a technique for preventing interference between a robot, for welding, and a clamp jig, for fixing a workpiece to be welded by the robot, in offline teaching of the robot.

2. Description of the Related Art

An offline teaching process is widely used in order to, for example, make a program for a welding operation (hereinafter, referred to as a welding program) using a welding robot. One problem in relation to making the welding program is how to deal with the existence of the clamp jig fixing the workpiece to be welded. In other words, interference between a work tool such as a welding torch or a part of a robot arm and the clamp jig may occur when a welding path is determined without considering the existence of the clamp jig and the robot is moved along the determined welding path. In a typically case, as described in one embodiment below, a clamp jig having a bridge shape may be used, which steps over the determined welding path.

In such a case, in an offline teaching of prior art, an operator teaches a path for preventing interference between the clamp jig and the robot. Concretely, the operator teaches a path for preventing interference extending from just before the clamp jig to just after the clamp jig. Further, the operator corrects a welding program such that welding is stopped at the starting point of the path and is restarted at the end point of the path. This operation imposes a heavy workload on the operator and induces deterioration of a work efficiency. An effective technique, for reducing the workload for preventing interference in offline teaching of the welding program and for improving the work efficiency, seems to have not been disclosed in any known document.

SUMMARY OF THE INVENTION

Accordingly, an object of the present invention is to resolve the above problems, to reduce the workload for preventing interference between the robot and the clamp jig in offline teaching of the welding program and to improve the work efficiency.

In order to resolve the above problems, the invention carries out following operations when a welding program is prepared in an offline programming device: automatically judging that a clamp jig fixing a workpiece to be welded is positioned on a welding line along which a welding robot carries out welding; reading out a path for preventing interference previously stored when the interference may occur; and inserting the path into the welding program to correct the program.

Concretely, according to the present invention, there is provided an offline programming device for making a welding program for carrying out welding of a workpiece, to be welded by using a robot, the offline programming device comprising: a displaying part indicating three-dimensional models corresponding to a welding robot, a workpiece to be welded and a clamp jig fixing the workpiece; a storing part for storing a path for preventing interference with the clamp jig associated with the three-dimensional model corresponding to the clamp jig; a path determining part for determining a welding path in relation to the three-dimensional model of the workpiece on the displaying part; a program making part for making a teaching program in which the robot carries out welding along the welding path determined by the path determining part; and an interference judging part simulating the teaching program made by the program making part and judging whether interference occurs between the robot and the clamp jig or not. The program making part is capable of inserting a path for preventing interference with the clamp jig into the teaching program, based on the stored path for preventing interference associated with the three-dimensional of the clamp jig, when the interference judging part judges that the robot will interfere with the clamp jig.

A plurality of the three-dimensional models may be stored, each of the three-dimensional models being associated with each path for preventing interference with each clamp jig represented by each three-dimensional model.

The stored path for preventing interference may include at least one of paths for preventing interference configured to adapt for a straight path, for a corner part and for an arc path.

The program making part is capable of inserting a command for stopping welding at a first position on the path for preventing interference, and a command for restarting welding at a second position on the path for preventing interference, into the teaching program when the program making part inserts the path for preventing interference into the program. Preferably, the three-dimensional positions of the first and the second positions on the path for preventing interference are the same.

The offline programming device according to the invention may further comprise: a dimension changing part for changing the dimension of the three-dimensional model of the clamp jig; and a path changing part for changing the path for preventing interference corresponding to the three-dimensional model of the clamp jig, based on the dimension of the three-dimensional model of the clamp jig changed by the dimension changing part.

The displaying part is capable of deleting an image of the clamp jig indicated on the displaying part.

The offline programming device according to the invention may further comprise: a download part for downloading the teaching program to an actual robot; an upload part for uploading the teaching program having a corrected part from the actual robot; and a correcting part which judges whether the corrected part of the teaching program includes a part of the stored path for preventing interference or not and corrects the path for preventing interference when the corrected part includes the part of the path for preventing interference.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 10:
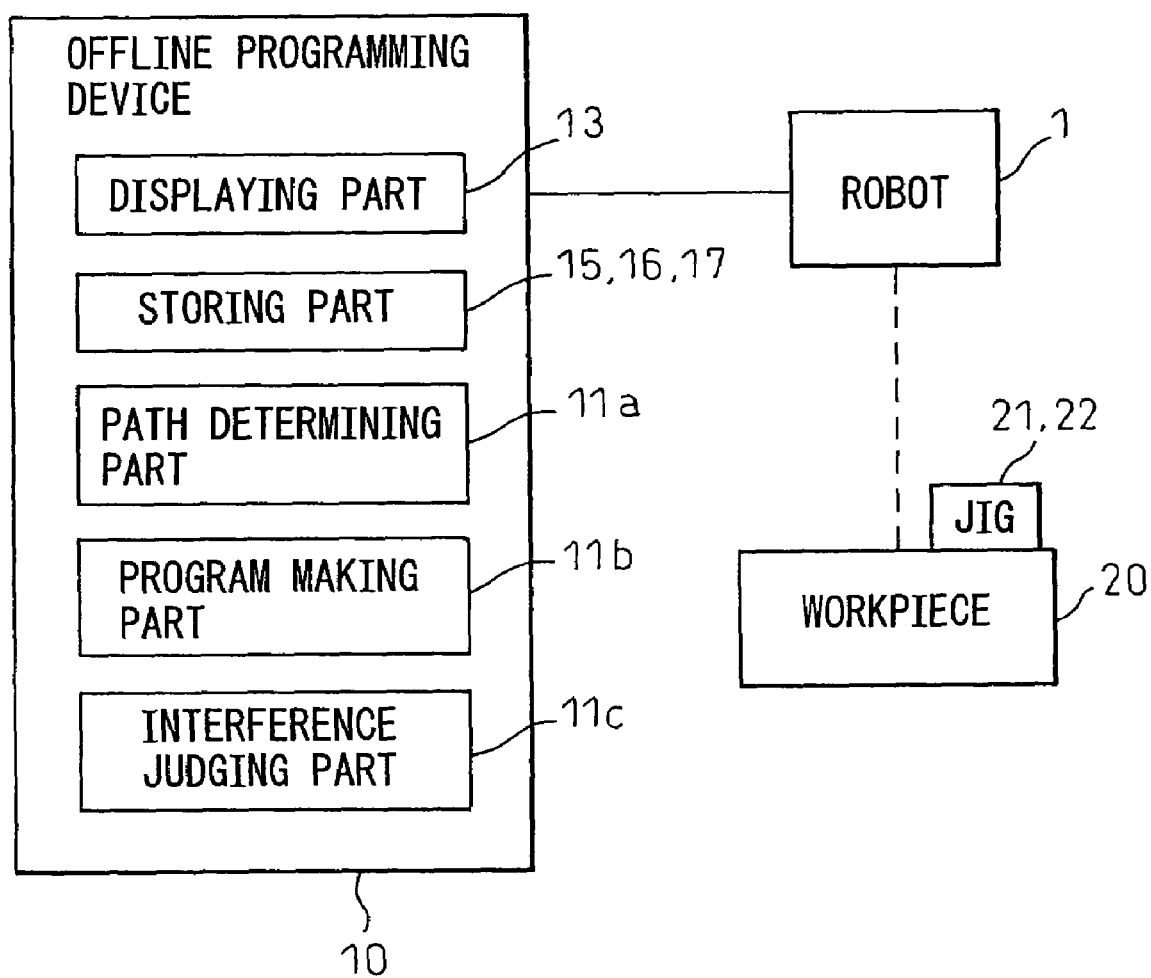
FIG. 10 is a showing a schematic configuration of the offline programming device according to the invention.

FIG. 10 is shows a schematic configuration of an offline programming device according to the present invention. An offline programming device 10 making a welding program for carrying out welding a workpiece 20 to be welded by using a robot 1 comprises: a displaying part 13 indicating three-dimensional models corresponding to a welding robot 1, a workpiece 20 to be welded and a clamp jig 21, 22 fixing the workpiece 20; a storing part 15, 16, 17 for storing a path for preventing interference with the clamp jig 21, 22 associated with the three-dimensional model corresponding to the clamp jig 21, 22; a path determining part 11a for determining a welding path in relation to the three-dimensional model of the workpiece 20 on the displaying part 13; a program making part 11b making a teaching program in which the robot 1 carries out welding along the welding path determined by the path determining part 11a; and an interference judging part 11c simulating the teaching program made by the program making part 11b and judging whether interference between the robot 1 and the clamp jig 21, 22 or not. The program making part 11b is capable of inserting a path for preventing interference with the clamp jig 21, 22 into the teaching program, based on the stored path for preventing interference associated with the three-dimensional of the clamp jig 21, 22, when the interference judging part 11c judges that the robot 1 interferes with the clamp jig 21, 22. In an embodiment described below, a CPU 11 described below may serve as the path determining part 11a, the program making part 11b and the interference judging part 11c. The CPU 11 may also serve as the dimension changing part, the path changing part, the download part, the upload part and the correcting part.

Figure 1:
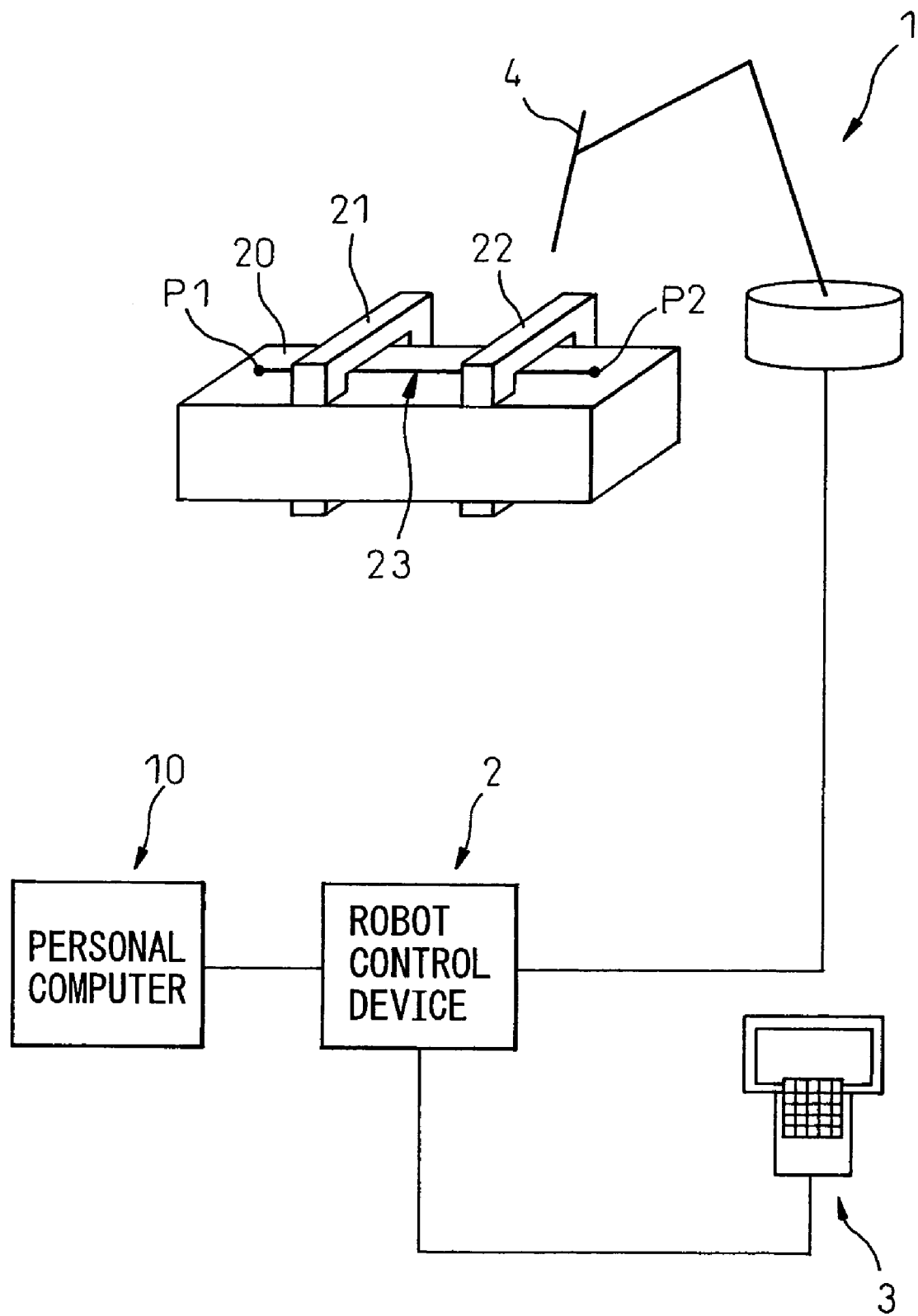
FIG. 1 is a diagram showing a total configuration including an offline programming device (a personal computer) according to one embodiment of the invention.

An embodiment of the invention will be described with reference to the attached drawings. First, FIG. 1 shows a total configuration including the offline programming device according to one embodiment of the invention. As shown, a numeral 1 denotes a robot (or a mechanism of an actual machine) having a welding torch (or a dummy for teaching having the same shape and dimension as the torch) 4 positioned on the end of a robot arm. The robot 1 is connected to a robot control device 2. A teaching operation panel 3 and a personal computer 10 are also connected to the robot control device 2. The personal computer 10 forms the offline programming device in the embodiment. A numeral 20 denotes a workpiece to be welded (or a dummy for teaching having the same shape and dimension as the workpiece). Jigs 21 and 22 for clamping the workpiece 20 are attached to the workpiece.

A numeral 23 denotes a line intended to be welded (hereinafter, referred to as a welding intended line). Hereinafter, the jigs for clamping may be simply referred as "jigs".

Each of the jigs 21 and 22 herein has a form of bridge which steps over the welding intended line 23 on a surface of the workpiece 20 on which the welding intended line 23 lies. The welding intended line 23 is indicated as a straight path extending from a starting position P1 to an end position P2 through generally central parts of the jigs 21 and 22. As shown in this example, when the robot 1 is moved simply along the straight path from the position P1 to the position P2, the robot 1 will interfere with the jigs 21 and 22 regardless of the taught orientation of the torch or the robot. (In fact, the robot is stopped before the robot reaches the jig 22.) Therefore, the interference regarding the jigs 21 and 22 is prevented in an offline teaching carried out in the personal computer 10, as described below.

Figure 2A:
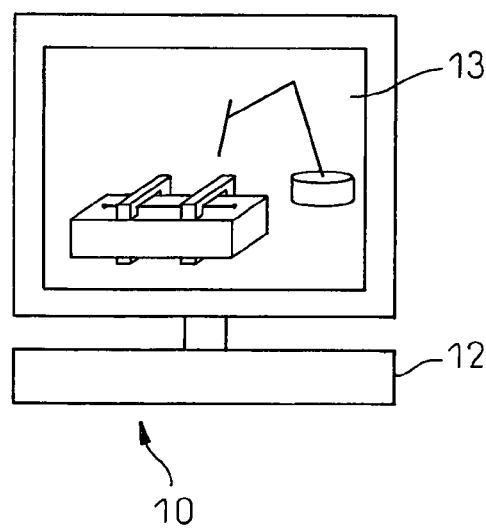
FIGS. 2a and 2b are outside and block diagrams of the offline programming device (the personal computer) shown in FIG. 1, respectively.
Figure 2B:
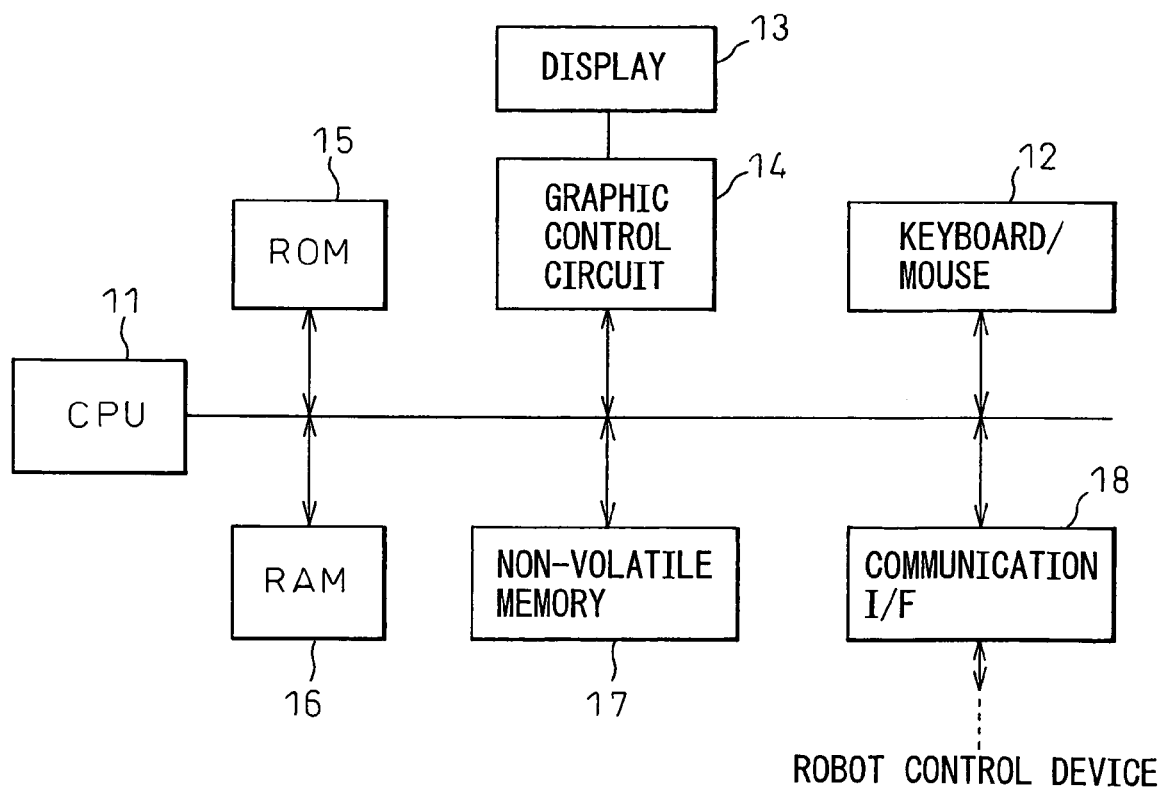

FIGS. 2a and 2b are outside and block diagrams of the personal computer 10 as the offline programming device, respectively. As shown, the personal computer 10 has a CPU 11. A keyboard and a mouse (a manual input device) 12, a graphic control circuit 14, memories (a ROM 15, a RAM 16 and a non-volatile memory 17) and a communication interface 18 are connected to a bus line of the CPU 11. A display 13 such a liquid crystal display unit or a CRT is connected to the graphic control device 14. Further, an I/O unit or the like, not shown, may be provided, for giving and receiving data to and from external equipment such as a printer, if need.

The memories may include data used in offline programming. The memories may also include a program and various set points for activating the graphic circuit to locate various objects defined as three-dimensional models, for indicating a teaching path being prepared by the teaching program and/or for indicating the position of the teaching point on the display. The memories may further include software for moving the directed teaching point to a desired corrected point by dragging the teaching point using the mouse and for storing data of the corrected teaching point.

Figure 3:
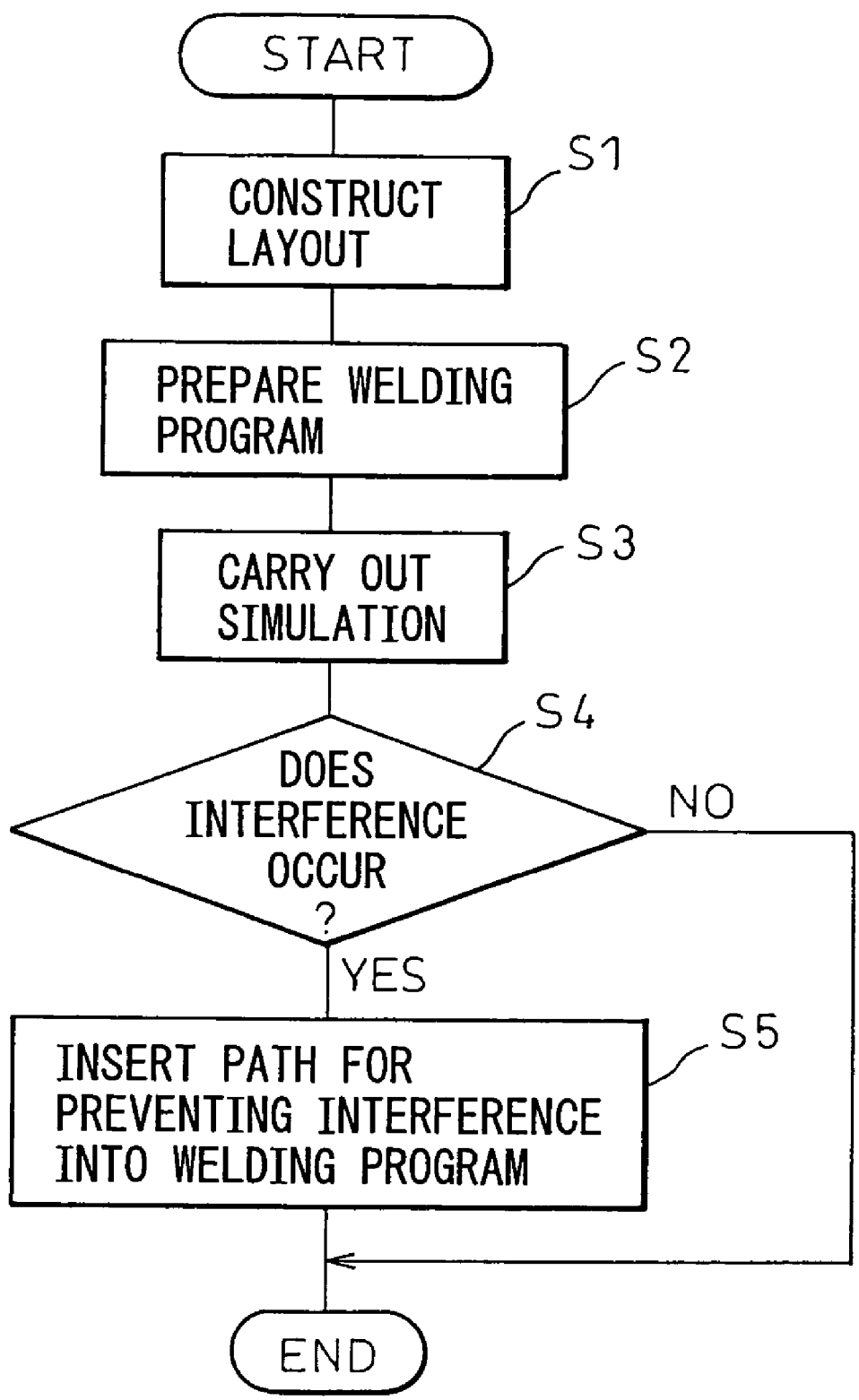
FIG. 3 is a flowchart showing a process carried out in the embodiment.

The configuration and the function described above may be the same as that of prior art. In the embodiment, however, in addition to the above, software and various data are provided for carrying out a process, according to a flowchart shown in FIG. 3, including determination of the welding path, motion simulation, judgment of interference and insertion of the path for preventing interference, by the CPU 11 or the like. The various data may include, in particular, data of the paths for preventing interference previously registered corresponding to the shape and the size of the jigs (hereinafter, referred to as a library of path for preventing interference), as well as the three-dimensional data of the robot 1, the workpiece 20 to be welded and jigs 21, 22.

A main point of each step of the flowchart will be described below.

Step S1

Figure 4A:
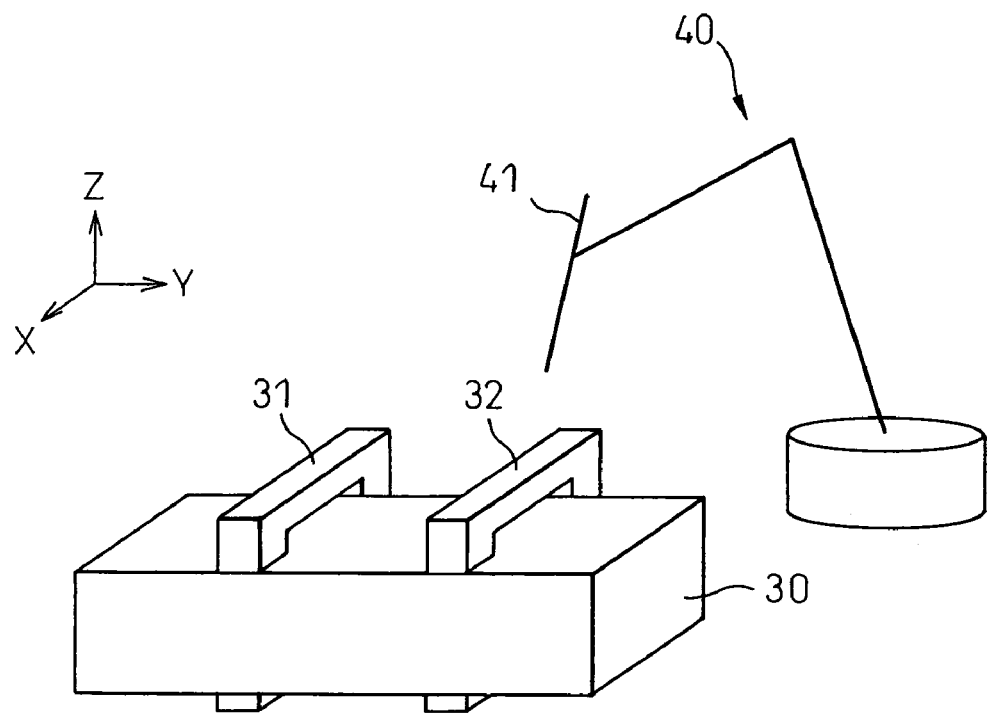
FIGS. 4a and 4b are diagrams showing a layout and the layout with a determined welding line (without considering a jig), respectively.

Images based on the three-dimensional models of the robot, the workpiece and clamp jigs are located on the display 13 (see FIG. 2). In this case, the images are located as shown in FIG. 4a. This location or a layout is a possible reproduction, in the offline system, of the actual layout in welding operation. In the layout shown in FIG. 4, the actual components shown in FIG. 1 (or the robot 1, the torch 4, the workpiece 20 and the jigs 21, 22) correspond to the images denoted by numerals 40, 41, 30 and 31, 32, respectively. In a space or a work cell including the layout, a coordinate system including X, Y and Z axes is defined. The direction of the welding line 23 (from the positions P1 to P2) shown in FIG. 1 coincides to +Y direction of the coordinate system.

Step S2

Figure 4B:
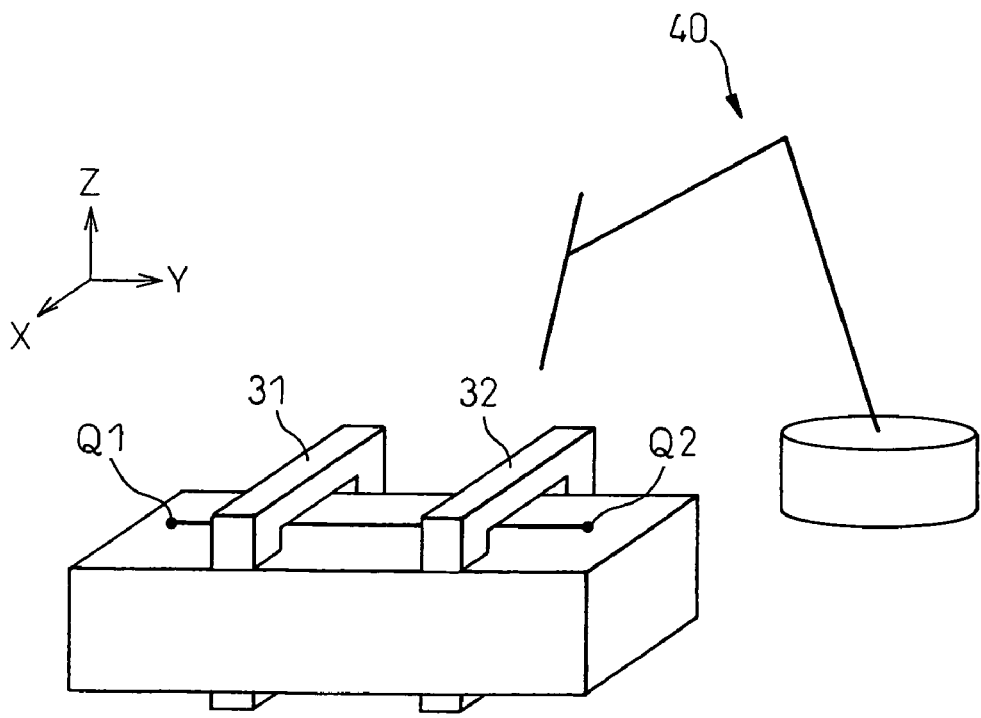

By using the conventional function of the offline programming device, the welding program is prepared without considering the existence of the clamp jigs 31 and 32. In this case, a straight path (from points Q1 to Q2) as shown in FIG. 4b is designated as the welding path of the welding program. The path from the points Q1 to Q2 corresponds to the path from the positions P1 to P2 shown in FIG. 1. In addition, when the images of the jigs 31 and 32 may be obstacle, the images may not be displayed by, for example, the operation using the manual operation means 12.

Steps S3 and S4

In order to judge whether the welding path from Q1 to Q2 designated in the welding program prepared in step S2 interfere with the jig 31 or 32 or not, the simulation of the welding program is carried out (step S3). When it is judged that interference occurs on the welding path, the process is progressed to step S5, otherwise, the process is terminated (step S4). Also, when it is judged that interference occurs, the three-dimensional model of the jig regarding interference is specified. In this embodiment, it is judged that interference occurs at each of the jigs 31 and 32.

In the judgment of interference, if a three-dimensional area being moved by the simulation occupied by a part including the robot 40 and the torch 41, being moved by the simulation in the area of the work cell, contacts or overlaps with a three-dimensional area occupied by the jigs 31 and 32, interference is judged to occur, otherwise, it does not occur. Such a simulation in the offline system and judgment of interference based on the simulation itself are known arts. Therefore, the detailed descriptions of them are omitted.

Step S5

Regarding a jig judged to cause interference in step S4 (the jigs 31 and 32 in this case), a path for preventing interference (or a preventing path) is inserted into the welding program. The preventing path is previously registered in the library of path for preventing interference. Examples of items of the three-dimensional models of the preventing path registered are shown in FIGS. 5a-5d. FIGS. 5a-5d show a preventing path f1 having a straight bridge shape W1 for a straight path, a preventing path f2 having an arc bridge shape W2 for a straight path, a preventing path f3 having a straight bridge shape W3 for a corner and a preventing path f4 having a straight bridge shape W4 for an arc path, respectively.

Figure 9:
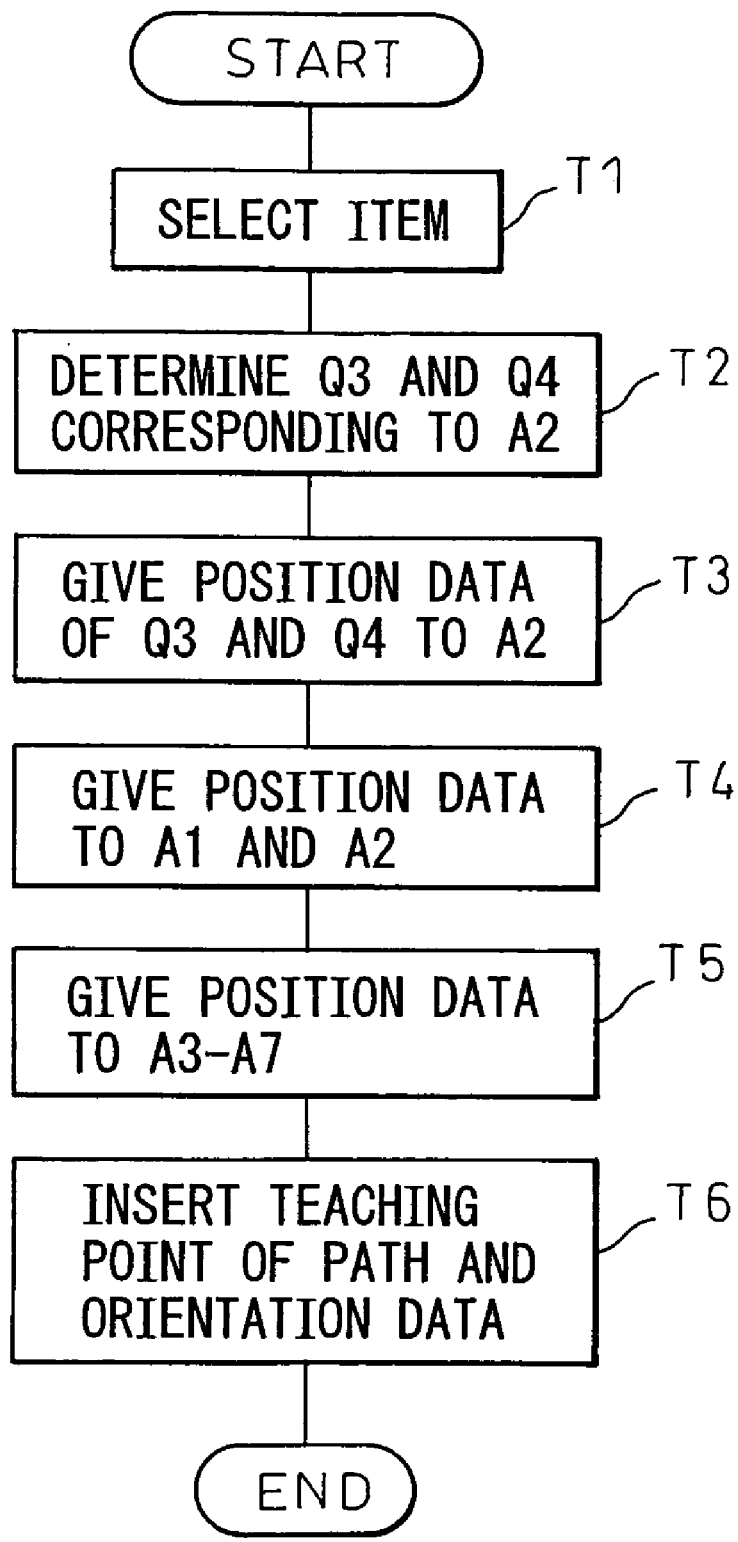
FIG. 9 is a flowchart explaining a method for determining a position where the path for preventing interference should be inserted, in relation to the welding line shown in FIG. 4b.

The preventing path of the items to be selected and the position of the welding path from Q1 to Q2 where the selected preventing path should be inserted are automatically determined by the process of a flowchart shown in FIG. 9. A main point of each step of the flowchart will be described below.

Step T1

Figure 5A:
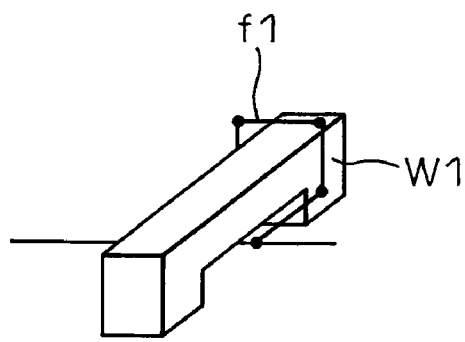
FIGS. 5a, 5b, 5c and 5d are diagrams showing model items stored in a library of paths for preventing interference and indicate the paths having a straight bridge shape for a straight path, an arc bridge shape for a straight path, a straight bridge shape for a corner and a straight bridge shape for an arc path, respectively.
Figure 5B:
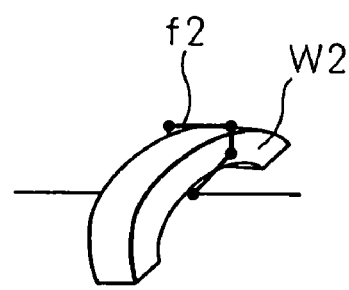
Figure 5C:
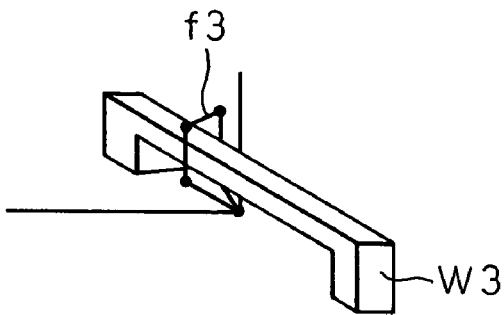
Figure 5D:
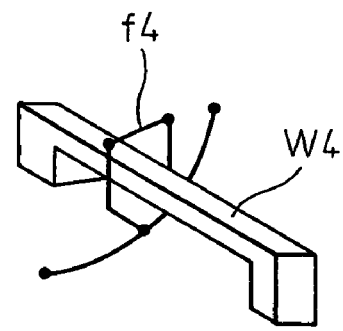

Based on the type of the jig judged to cause interference and the type of the path passing through the jig, the item in the library to be selected is determined. The type of the jig may be represented, for example, by a registered code of the shape and the size of the jig attached to the three-dimensional model of the jig in the offline system and a code of the library corresponding to the above code. In this case, as for interference of each of the jigs 31 and 32, the preventing path having a straight bridge shape for a straight path shown in FIG. 5a is selected. The details of this is shown in FIG. 6.

Figure 6:
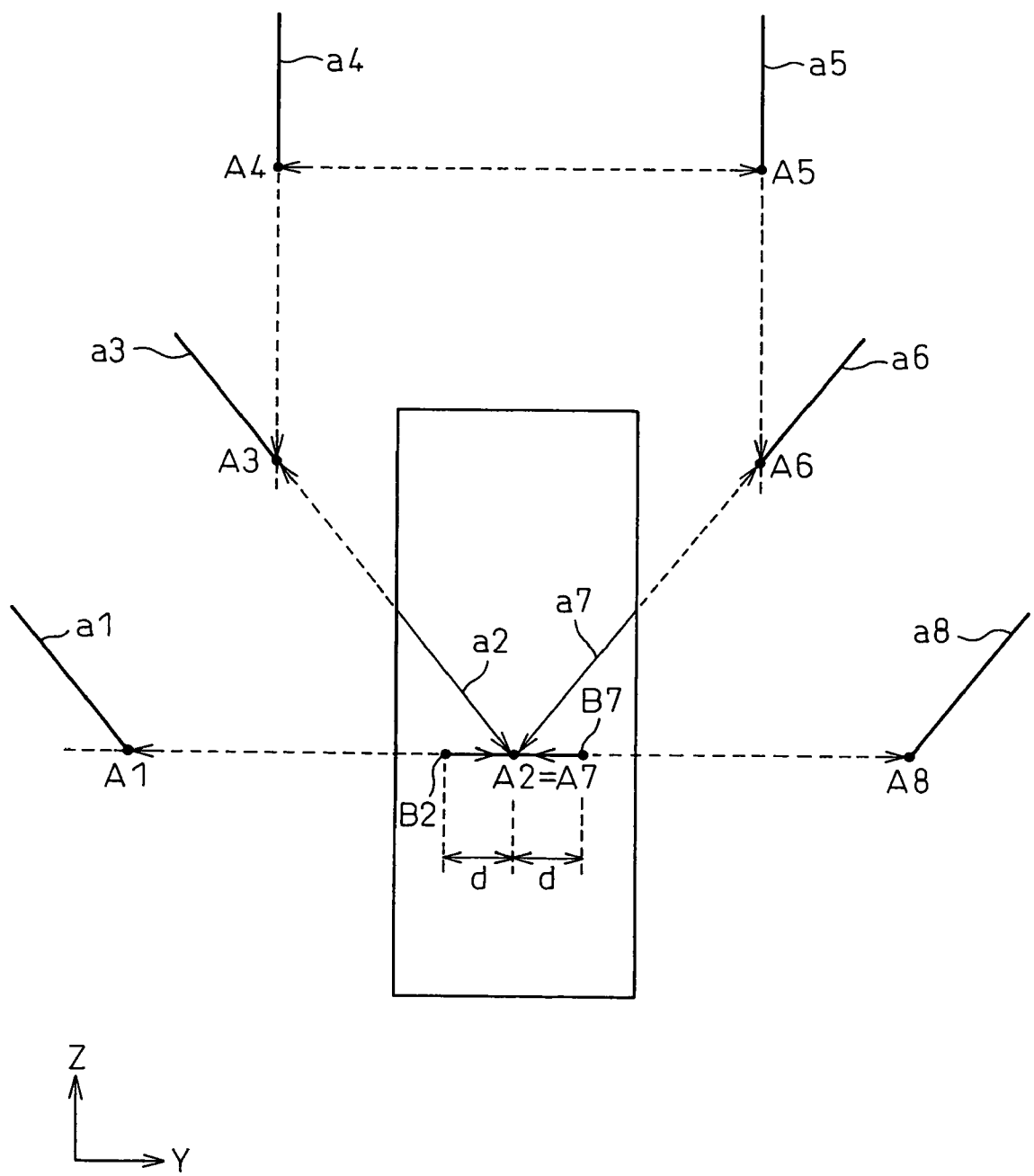
FIG. 6 is a diagram showing a detail of the path having the straight bridge shape for a straight path (FIG. 5a)

In FIG. 6, a point A2 is a reference point positioned right below a center of a part having a bridge-shape stepping over the welding line. The positions data of points A1 and A3-A8 may be calculated and registered by using three-dimensional incremental values relative to the point A2. The position of the point A7 is the same as the position of the point A2. A whole of the preventing path has a shape of a home base with a line from A1 to A2 and a line A7 to A8. Therefore, the preventing path starts from the point A1 (or a starting point of the preventing path) before the bridge (or the model of the jig) and progresses to the point A2 right below the bridge. The preventing path then is directed to the upper left toward the point A3, goes up to the point A4 and horizontally progresses to the point A5. the preventing path further goes down to the point A6, enters into the bridge from opposite side of the bridge toward the point A7 (or A2) and reaches to the point A8 (or an end point of the preventing path).

Each point A1-A8 is a point inserted to the welding program as a teaching point. Each orientation of the torch (or each orientation of a tool center point) a1-a8 is previously designated corresponding to the each point A1-A8, respectively. The orientations of the torch corresponding to the points A2 and A7 right below the bridge are inclined for preventing interference between the torch and the bridge. The orientation of the torch designated at the point A1 is preferably the same as that on another welding line connected just before the point A1. Similarly, the orientation of the torch designated at the point A8 is preferably the same as that on still another welding line connected just after the point A8. Preferably, the orientations of the torch at the points A3-A6 are determined such that the orientations of the torch from the point A2 to the point A7 are gradually changed.

Step T2

In order to determine a position or a part of the welding line from Q1 to Q2 where the preventing path from A1 to A8 should be inserted or partly replace, points Q3 and Q4 corresponding to the point A2 are selected on the welding line designated in the welding program. In this case, the points Q3 and Q4 are determined as the points right below the jigs 31 and 32, respectively, on the welding line from Q1 to Q2. In other words, each of the points Q3 and Q4 are a midpoint of the each bridge in width or in Y direction.

Step T3

The three-dimensional data of the points Q3 and A4 are given to the point A2.

Step T4

The three-dimensional data of the point A1 is given or calculated such that the point A1 is positioned on a line segment from Q1 to Q3, further, the three-dimensional data of the point A8 is given such that the point A8 is positioned on a line segment from Q3 to Q4. The three-dimensional data of the other points A2-A7 are given such that the points are positioned on a YZ plane. Thus, the position where the path for preventing interference with the jig 31 should be inserted is uniquely determined.

Step T5

The three-dimensional data of the point A1 is given or calculated such that the point A1 is positioned on a line segment from Q3 to Q4, further, the three-dimensional data of the point A8 is given such that the point A8 is positioned on a line segment from Q4 to Q2. The three-dimensional data of the other points A2-A7 are given such that the points are positioned on a YZ plane. Thus, the position where the path for preventing interference with the jig 32 should be inserted is uniquely determined.

Step T6

Based on the calculated results of steps T4 and T5, a total of sixteen points between the positions P1 and P2 are written in the welding program, as well as the three-dimensional data of the points and the orientation of the torch designated in the library corresponding to each point. A positioning degree (described below) corresponding to each point is also written in the program. The positioning degree may be previously designated by the operator.

Figure 7:
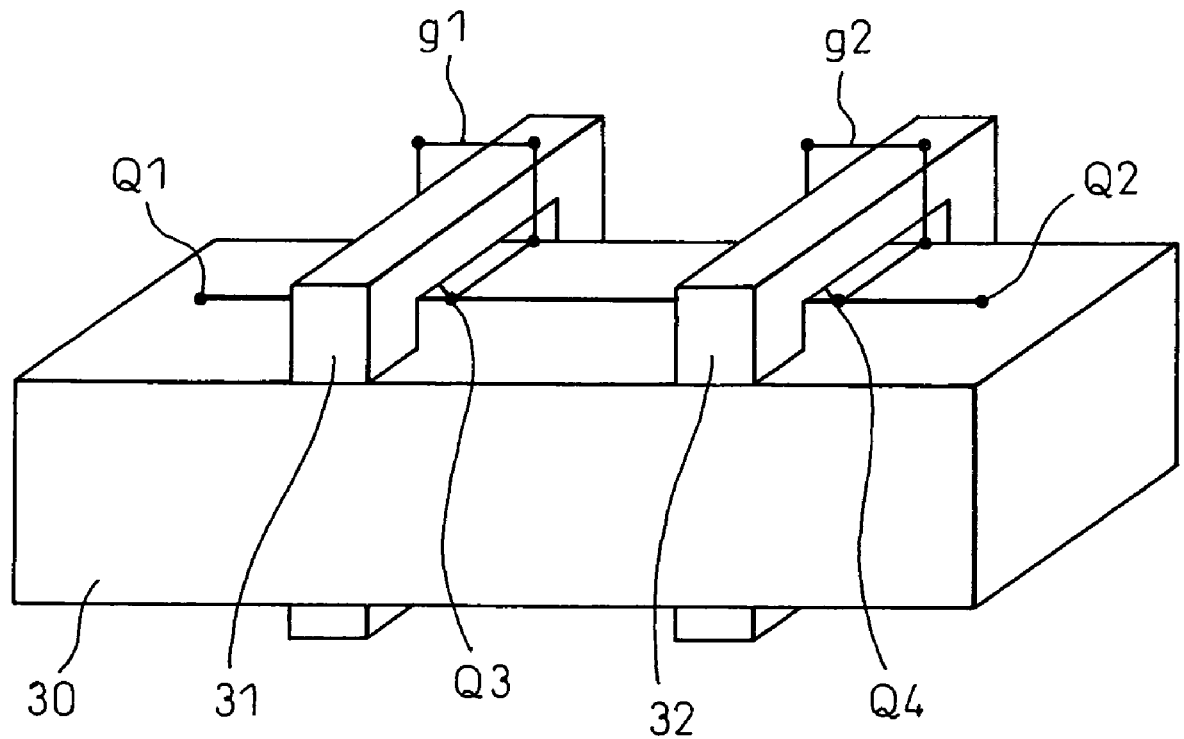
FIG. 7 is a diagram showing a corrected teaching path being inserted the path for preventing interference, in relation to the welding line shown in FIG. 4b.

As described above, the welding path including the orientation of the torch for preventing interference with both of the jigs 31 and 32 may be prepared, as indicated in FIG. 7. In FIG. 7, numerals g1 and g2 indicate paths for preventing interference with the jigs 31 and 32, respectively.

The thus corrected welding program may be downloaded to the actual robot (or the robot control device 2 shown in FIG. 1) so as to carry out a trial playback run at low speed. If the welding program has a problem, the problem may be uploaded and utilized for correcting the offline program. For example, in case that interference is on the point of occurring (for example, there is no margin of heat deformation during welding) when the points A2 and A7 are the same, the library data may be corrected by the manual operation means 12 (see FIG. 2) so as to retry insertion of the preventing path. As an example of correction of the library data, the points A2 and A7 may be replaced with points B2 and B7 as shown in FIG. 6. When a preventing path including this correction is inserted to the welding path, a non-welded part may remain below the bridge. However, the non-welded part having a very small area may often be permissible. If it is not permissible, the associated jig may be remade. In this case, the model data of the jig in the library data of the preventing path may be correspondingly corrected, such that the preventing path corresponding to the remade jig may be inserted into the welding path.

Conditions of stopping and restarting of welding on the preventing path and/or welding conditions (for example, a welding voltage, a welding current, a feed speed of a welding wire, a welding speed, a processing time of craters, etc.) are arbitrarily set in advance. For example, an arc welding condition in which the arc is turned off at a first position or the point A2, the torch is moved from the point A2 to the point A7 in the arc-off condition and the arc is turned on again at a second position or the point A7 which is the same three-dimensional point as the point A2. In this case, normally, the positioning degree at each of the points A2 and A7 of the jigs 31 and 32 may be designated as "100%" (i.e., the preventing path strictly passes the points A2 and A7) and at each of the other point A1, A3-A6 and A8 may be designated as "0%" (i.e., the preventing path does not strictly pass the other points, in other words, the torch or the tool center point is moved without stopping at the other points).

As for a moving speed along the preventing path, the moving speed, from the point A1 to the point A2 and from the point A7 to the point A8, is preferably the same as a commanded speed of the welding program before the preventing path is inserted thereto. Further, the moving speed from the point A2 to the point A7 via the points A3-A6 is preferably set to a possible high-speed (for example, a maximum speed) so as to improve a work efficiency.

Also, it is possible to judge the necessity of further changing of the preventing path of the welding program after inserted the path thereto, by setting the conditions below:

(i) A necessary ratio of the welding line to be welded in relation to the whole welding line;

This may be a benchmark for judging that the orientation of the torch should be intentionally changed to weld the welding line at the position, for example, below the bridge shape of the clamp jig. When this condition is not satisfied, it is necessary to, for example, consider a reconstruction of the clamp jig.

(ii) A possible range of changing the orientation of the torch (or an angle of advance and a targeting angle of the torch in relation to the welding path);

When this condition is not satisfied, it is necessary to, for example, correct the orientation of the torch in the library data.

(iii) Time or a distance required for returning the orientation of the torch after passing the preventing path to that before passing the preventing path;

When this condition is not satisfied, it is necessary to correct the preventing path in the library data.

Further, even if the program path on which the clamp jig is positioned has a shape of a corner, an arc or a curved line, the preventing path may be suitably inserted in the same way as the above, by registering a preventing path corresponding to each shape and each type of the jigs.

Figure 8A:
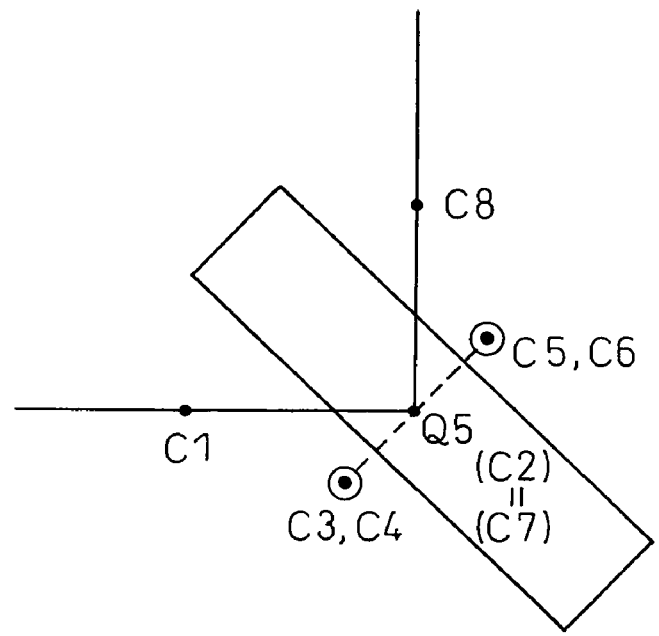
FIGS. 8a and 8b are diagrams showing details of the paths having the straight bridge shape for a corner and the straight bridge shape for an arc path stored in the library, respectively.
Figure 8B:
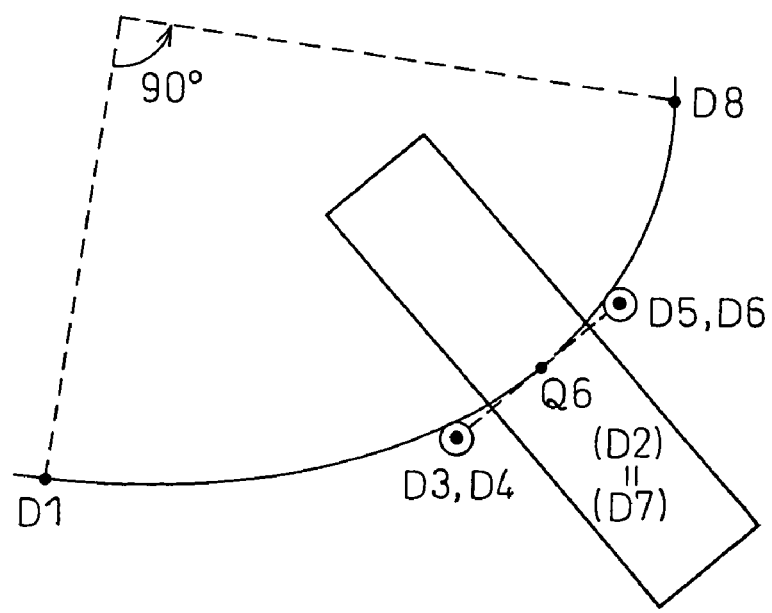

As an example, FIGS. 8a and 8b show a preventing path having a straight bridge shape for a corner and a preventing path having a straight bridge shape for an arc path stored in the library, respectively. Although the torch is omitted, the orientation of the torch is registered corresponding to each point C1-C8 or D1-D8 inserted as a teaching point, in a similar way as shown in FIGS. 5a-5d, such that interference regarding the torch does not occur and the orientation of the torch is not abruptly changed. In the examples shown in FIGS. 8a and 8b, the points C2 and D2 are reference points corresponding to the point A2 shown in FIG. 6. Also, each segment between the points C2-C7 and D2-D7 has a shape of a home base, an upper part of which steps over the bridge, similarly to the above shape of the points A2-A7.

Therefore, when interference occurs at a corner, the preventing path may be inserted such that the point C2 (=C7) may be coincided with a point Q5 of the corner on the welding path designated in the program before inserted the preventing path thereto and the each point C1 and C8 is positioned on each straight path of the welding path in the similar way of the above points A1 and A8. The detailed description of calculation for this may be the same as the above and, thus, is omitted.

A similar way may be available in case that interference occurs at the arc. Therefore, the preventing path may be inserted such that the point D2 (=D7) may coincide with a point Q6 of the arc (having a central angle of 90 degrees in the example) on the welding path designated in the program before inserted the preventing path thereto and the points D1 and D8 are positioned on a starting and an end point, respectively. The detailed description of calculation for this may be simple and the same as the above and, thus, is omitted.

In prior art, the operator teaches a motion for preventing interference between the clamp jig and the torch or the robot. However, by using the offline programming device of the invention, judgment of interference with the jig and insertion or addition of the path for preventing interference may be carried out on the offline system, resulting in the offline program being prepared in shorter time.

In other words, by the offline programming device according to the invention, when the operator prepares or makes a program for carrying out welding by the robot, a path for preventing interference with the jig, which interference may occur when a playback running of the program is carried out as it is, may be automatically added or inserted to the program. Therefore, the workload of the operator may be remarkably reduced, resulting in improving the work efficiency.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An offline programming device for making a welding program for carrying out welding of a workpiece, to be welded by using a robot, the offline programming device comprising:
   a display indicating three-dimensional models corresponding to a welding robot, a workpiece to be welded and a clamp jig fixing the workpiece;
   a memory for storing a path for preventing interference with the clamp jig associated with the three-dimensional model corresponding to the clamp jig;
   a path determining part for determining a welding path in relation to the three-dimensional model of the workpiece on the displaying part;
   a program making part for making a teaching program in which the robot carries out welding along the welding path determined by the path determining part; and
   an interference judging part simulating the teaching program made by the program making part and judging whether interference occurs between the robot and the clamp jig or not,
   wherein the program making part is capable of inserting a path, corresponding to the three-dimensional model of the clamp jig, for preventing interference with the clamp jig into the teaching program, based on the stored path for preventing interference associated with the three-dimensional model of the clamp jig, when the interference judging part judges that the robot will interfere with the clamp jig,
   wherein the program making part is capable of inserting a command for stopping welding at a first position on the path for preventing interference and a command for restarting welding at a second position on the path for preventing interference into the teaching program when the program making part inserts the path for preventing interference into the program, and
   wherein the three-dimensional positions of the first and the second positions on the path for preventing interference are the same.

2. The offline programming device as set forth in claim 1, wherein a plurality of the three-dimensional models are stored, each of the three-dimensional models being associated with each path for preventing interference with each clamp jig represented by each three-dimensional model.

3. The offline programming device as set forth in claim 1, wherein the stored path for preventing interference includes a path for preventing interference configured to adapt for a straight path.

4. The offline programming device as set forth in claim 1, wherein the stored path for preventing interference includes a path for preventing interference configured to adapt for a corner part.

5. The offline programming device as set forth in claim 1, wherein the stored path for preventing interference includes a path for preventing interference configured to adapt for an arc path.

6. The offline programming device as set forth in claim 1, further comprising:
   a dimension changing part for changing the dimension of the three-dimensional model of the clamp jig; and
   a path changing part for changing the path for preventing interference corresponding to the three-dimensional model of the clamp jig, based on the dimension of the three-dimensional model of the clamp jig changed by the dimension changing part.

7. The offline programming device as set forth in claim 1, wherein the display is capable of deleting an image of the clamp jig indicated on the displaying part.

8. The offline programming device as set forth in claim 1, further comprising:
   a download part for downloading the teaching program to an actual robot;
   an upload part for uploading the teaching program having a corrected part from the actual robot; and
   a correcting part which judges whether the corrected part of the teaching program includes a part of the stored path for preventing interference or not and corrects the path for preventing interference when the corrected part includes the part of the path for preventing interference.

9. The offline programming device as set forth in claim 1, wherein the orientation of a welding torch of the robot between the first and second positions is determined such that the orientation of the welding torch from the first position to the second position is gradually changed.

* * * * *

UNITED STATES PATENT AND TRADEMARK OFFICE
CERTIFICATE OF CORRECTION

| | | |
|---|---|---|
| PATENT NO. | : 7,613,545 B2 | Page 1 of 1 |
| APPLICATION NO. | : 11/099504 | |
| DATED | : November 3, 2009 | |
| INVENTOR(S) | : Watanabe et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 932 days.

Signed and Sealed this

Nineteenth Day of October, 2010

David J. Kappos
*Director of the United States Patent and Trademark Office*